W. C. BRUBAKER.
BOLT.
APPLICATION FILED APR. 5, 1916.
1,210,595.
Patented Jan. 2, 1917.
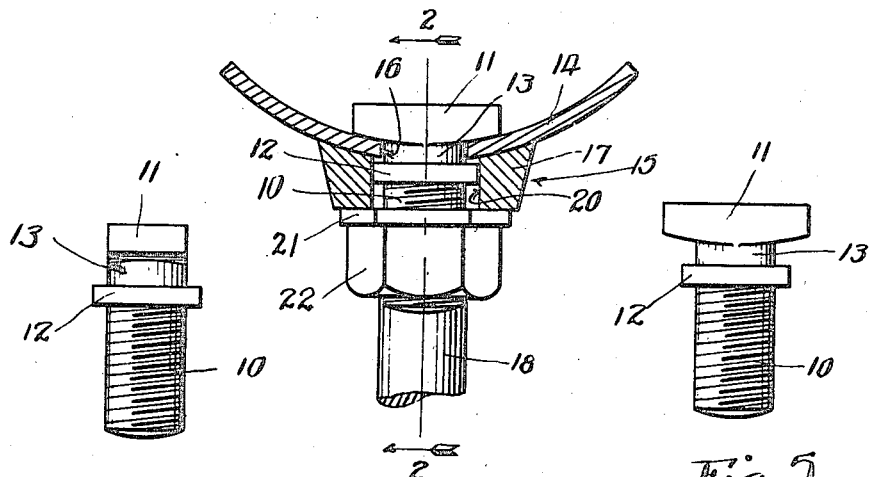
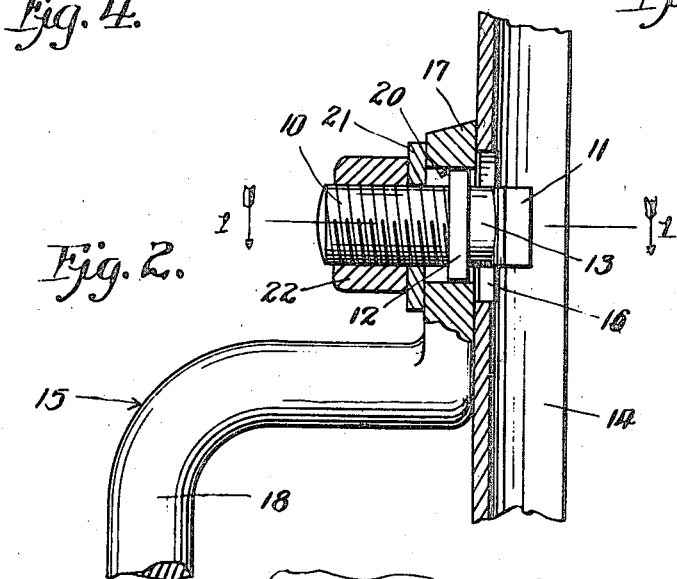
Witnesses:
P. F. Poole
Clara D. Peoples
Inventor:
William C. Brubaker.
by Poole & Warn,
Attys.

UNITED STATES PATENT OFFICE.

WILLIAM C. BRUBAKER, OF CHICAGO, ILLINOIS.

BOLT.

1,210,595.  Specification of Letters Patent. Patented Jan. 2, 1917.

Application filed April 5, 1916. Serial No. 89,019.

*To all whom it may concern:*

Be it known that I, WILLIAM C. BRUBAKER, a citizen of the United States, and a resident of Chicago, in the county of Cook, State of Illinois, have invented certain new and useful Improvements in Bolts; and I do hereby declare that the following is a full, clear, and exact description thereof, reference being had to the accompanying drawings, and to the reference characters marked thereon, which form a part of this specification.

This invention relates to improvements in fastening devices, and more particularly to fastening devices of that character employing bolts for the purpose of fastening or securing fixtures to frames or bodies and where the usual forms of bolts cannot be employed, thereby necessitating the use of lag-screws or other fastening means, which are not as dependable or safe as a bolt and nut.

A familiar field for the use of a bolt embodying the features of my invention is in the construction of freight and passenger cars, as, for instance, in the fastening of grab-irons to the car, and in fact it is adaptable for use wherever it is desired to secure two members together or to fasten one member to another under conditions where access is possible to only one side of the member having an aperture through which the shank of the bolt may be inserted. The mounting of a grab-iron on a car is illustrative of the impossibility of the use of the usual type of bolt, inasmuch as the grab-irons are ordinarily attached after the body of the car is completed, and hence the framework to which they are attached is completely sealed, so that access to the exterior plates or frame members from the interior of the car is rendered impossible for the purpose of inserting the bolt through the plate or frame member with its head on the opposite side thereof from the member to be fastened. This condition is also met with in numerous other instances in the manufacture of cars, as well as in the other branches of structural work.

The object to be accomplished by my invention, therefore, is to provide a construction for a bolt that may be secured to a member from one side or outside thereof, so that all of the operations, in fastening another member thereto, are accomplished from the same side of the supporting member to which the attached member is to be fastened.

The features of my invention are clearly set forth in the accompanying drawings, wherein is shown the use of the bolt as a means for fastening a grab-iron to a plate on the exterior of a car.

In the drawings—Figure 1 is a cross-sectional view taken on line 1—1 of Fig. 2 and showing a plate or frame member and one end of a grab-iron attached thereto, the bolt being shown in elevation; Fig. 2 is a view in vertical section taken on line 2—2 of Fig. 1; Fig. 3 is a fragmentary view of the plate, showing the shape of the slot therein; Fig. 4 is a view in side elevation of the bolt removed; and Fig. 5 is a view in end elevation of the bolt removed.

Referring first to the construction of the bolt itself (Figs. 4 and 5), the same comprises the general features of an ordinary bolt, namely, a cylindric, threaded shank 10 and an enlarged head at one end of the shank. In my improved bolt, however, the head 11 is of a particular shape, calculated to perform a definite function, as will hereinafter appear. The head is shaped in the form of an elongated, rectangular block, being substantially oblong in transverse sectional contour, and substantially equal in width to the diameter of the shank 10. The length of the head is approximately twice its width and extends transversely to said shank and projects a short distance in opposite directions beyond said shank. Spaced a short distance from the head 11 is a rectangular shaped, integral collar, constituting a key 12, and separated from the head 11 by a short and smooth, cylindric portion 13 of the shank. The key 12 is preferably square in sectional contour and extends laterally beyond the surface of the shank. As shown in the drawings, the key is greater in transverse dimensions that the width of the head 11, but less than the length of said head. The thickness of the key is such as to give the necessary strength to resist the turning of the bolt when said collar is held stationary in the manner hereinafter pointed out.

Referring now to the members which are fastened together by said bolt, and the particular construction employed to permit the application of the bolt, a curved plate 14 is shown, which represents a metal corner plate or member which is secured in vertical position to the exterior of a car in the usual manner. To the outer or convex surface of this plate is fastened a grab-iron 15, the bolts being located at each end of the grab-iron in the usual manner, although for the purpose of illustration only one end portion of a grab-iron is shown. At the points where the bolts are to be applied, the plate is provided with a rectangular and elongated aperture 16 (Fig. 3), extending through the plate, thereby providing a slot having a length which exceeds its width. As a preferable construction, the length of the slot is shown as substantially twice the width thereof and approximately the shape and size of the head 11 of the bolt, although slightly greater, so that the latter can be easily inserted through said slot. It is apparent now that, by reason of the shape of the head and slot, the bolt can be inserted head foremost into the slot, and when the head has passed beyond the slot, the bolt may be partially rotated through an angle of say 90°, to a position such that it becomes securely locked in place, and if retained in such position said bolt will be securely fastened to the plate, with the longer margins of the slot engaging and embracing the cylindric portion 13 between the head and the key 12.

As illustrated in the drawings, the surfaces of the head which contact with the rear surface of the plate are curved to conform with the concave contour of said surface, in order that a close bearing contact may be secured. The contour of these particular surfaces of the bolt may be obviously modified in practice, depending on the character of the surface of the member which the head 11 engages. Furthermore, the length of the portion 13 of the bolt, separating the head 11 and key 12, can be varied, depending upon the thickness of the plate or member 14, it being desirable that the key be spaced a short distance from the outer surface of said plate or member. Inasmuch as all the dimensions of the key exceed the width of the slot, only the head 11 and portion 13 enter the slot, said key acting as a stop which serves to prevent the bolt being accidentally pushed entirely through the slot and dropping behind the plate and consequently lost.

Referring now to the grab-iron 15, the same comprises a foot 17 at each end and a bar 18 extending between said feet and offset therefrom in the usual manner. Each foot comprises an enlarged and flattened member, having at its center a square aperture 20 extending therethrough. In addition to its square or rectangular shape, the aperture 20 is approximately of the same dimensions as the key 12, although slightly greater, in order that the key 12 may enter and snugly engage said aperture. To fasten the grab-iron to the plate, therefore, the bolt is first inserted head foremost into the slot 16 of said plate and from the outer side thereof, and rotated through an angle of 90° in the manner hereinbefore described. The foot of the grab-iron is then applied to the bolt in such manner that the shank is inserted through the aperture 20 in said foot, said aperture being so disposed or arranged with respect to said key that the latter will register with and enter said aperture, when the bolt is in locked position. It is clear now that, as soon as the key engages the square aperture of the foot, the bolt is securely held from rotation and hence in locking engagement with the plate 14. The operation of securing the grab-iron to the plate is completed by applying a washer 21 and a nut 22 to the threaded end of the bolt shank 10 in the usual manner, thus forcing the foot 17 tightly against the plate and securely connecting all parts together.

A bolt constructed in this manner is exceedingly simple in form, and is chiefly advantageous as a fastening means, for the reason that it can be easily applied and removed, with equal readiness, by removing the grab-iron or other member which the bolt fastens to the frame-work of the car, thereby permitting the bolt to be rotated and the head released from the slot. This feature is of equal importance in case replacement is necessary through accident or wear, in that a new bolt can be easily applied to replace the bolt removed, whereas with the ordinary type of bolt it would be difficult to replace, if not impossible, without tearing down or removing the interior work of the car in order to gain access to the inner surface of the plate or frame member for the purpose of inserting the ordinary form of bolt through the usual round aperture or bolt hole. As a result, therefore, the replacement of the ordinary bolt is impossible, and a lag-screw must be used, which, from the point of safety, is greatly inferior to a bolt as a secure fastening means. A further advantage, already suggested, is the presence of the square key, which prevents the entire bolt passing through the slot in the act of inserting the head therein and applying the grab-iron or other member. This feature not only prevents the loss of the bolt, but increases the facility with which the bolt can be applied, inasmuch as no particular degree of care need be exercised in applying the bolt or in holding the same from endwise movement while the shank thereof is being inserted through the aperture of the member to be fastened by the bolt.

From the statements hereinbefore made it is apparent that the use of the bolt embodying the features of my invention is not limited to any particular character of work, but is applicable for use wherever it is convenient or necessary to apply the bolt from the outside of the frame or body to which a member is to be fastened. For this reason I do not wish to be limited in the scope of the invention, except in so far as set forth in the appended claims.

I claim as my invention:

1. The combination with two members adapted to be connected together, of a bolt provided with a head insertible through a registering aperture in one of said members and adapted to effect a locking engagement between said bolt and member by the partial rotation of the bolt, and a shank adapted to extend through an aperture in the other of said members, said bolt having means coacting with said last mentioned member for preventing the rotation of said bolt from locking engagement with said first mentioned member.

2. The combination with two members, each provided with an aperture, of a bolt adapted to connect said members together and comprising a shank provided at one end with a head insertible through the aperture of one of said members, said head and aperture being shaped to effect the locking engagement of said bolt and member by the partial rotation of the bolt out of position of insertion, said bolt having means, acting to prevent the shank of said bolt from passing through said aperture and coacting with the other of said members to prevent the rotation of said head from locking position.

3. The combination of two members, each being provided with an aperture, of a bolt provided with a head insertible through the aperture of one of said members and shaped to effect the locking engagement of said bolt and member upon the partial rotation of said bolt from the position of insertion, and having a key integral with said bolt and registrable with the aperture of the other of said members, said key and last mentioned aperture having coacting surfaces, adapted to prevent the rotation of said bolt from locking position.

4. The combination with a supporting member provided with an aperture and a member adapted to be fastened thereto, of a bolt adapted to be secured to said supporting member by the insertion of said bolt head foremost through said aperture and the subsequent partial rotation thereof, said bolt being provided with a key located adjacent to said head, and non-insertible in said aperture, and adapted to coact with the other member to prevent the rotation of said bolt.

5. The combination with a supporting member and a member to be fastened thereto, of a bolt provided with an elongated head, said supporting member having a slot adapted to register with said head, said bolt being insertible head foremost through said slot and to become locked thereto upon the partial rotation of said bolt out of registering position, said bolt having means coacting with the other member for retaining the bolt in locking position.

6. The combination with a supporting member and a member to be fastened thereto, of a bolt provided with an elongated head, said supporting member having an elongated slot through which said head is insertible, said bolt being locked to said supporting member by the partial rotation of said bolt out of the position of insertion, and having a key adjacent to said head, non-insertible through said slot and adapted to coact with the other member, to prevent the rotation of said bolt.

7. The combination with a supporting member and a member adapted to be attached thereto, of a bolt for fastening said members together, comprising a threaded shank, an elongated head at one end thereof, said supporting member being provided with an elongated slot adapted to admit said head, said bolt being partially rotated to effect the locking engagement of the head and supporting member, and having a rectangular key adjacent to and spaced from said head and projecting laterally from the sides of said shank, said key acting to prevent the passage of said shank through said slot, the other member being provided with an aperture adapted to receive the shank of the bolt and having rectangular surfaces coacting with said key to prevent the rotation of the bolt from locking position, and a nut engaging the threaded shank of said bolt adjacent said last mentioned member.

8. The combination with a supporting member provided with an elongated slot and a member to be attached thereto, of a bolt comprising a threaded shank, an elongated head at one end thereof, adapted to be inserted through said slot of the supporting member and to be partially rotated out of registering position to effect the locking of said bolt and supporting member, said bolt having a rectangular key spaced a short distance from said head and non-insertible in said slot, the other member being provided with a rectangular aperture adapted to receive the shank of the bolt and engage said key to prevent the rotation of said bolt, and a nut mounted on the end of said shank and bearing on said last mentioned member.

9. The combination with a supporting member provided with an elongated slot and a member to be attached thereto, of a bolt comprising a shank, an elongated head at one end adapted to be inserted through said slot of the supporting member and to be partially rotated out of registering position to effect the locking of said bolt and supporting member, said bolt having a rectangular key spaced a short distance from said head and having its smallest lateral dimension exceeding the smallest dimension of said slot, the other member being provided with an aperture adapted to receive the shank of the bolt and engage said key to prevent the rotation of said bolt, and a nut mounted on the end of said shank and bearing on said last mentioned member.

In testimony that I claim the foregoing as my invention, I affix my signature in the presence of two witnesses, this 31st day of March, A. D. 1916.

WILLIAM C. BRUBAKER.

Witnesses:
  LAMAR G. WELD,
  ARTHUR JANSSEN.